Figure 1:
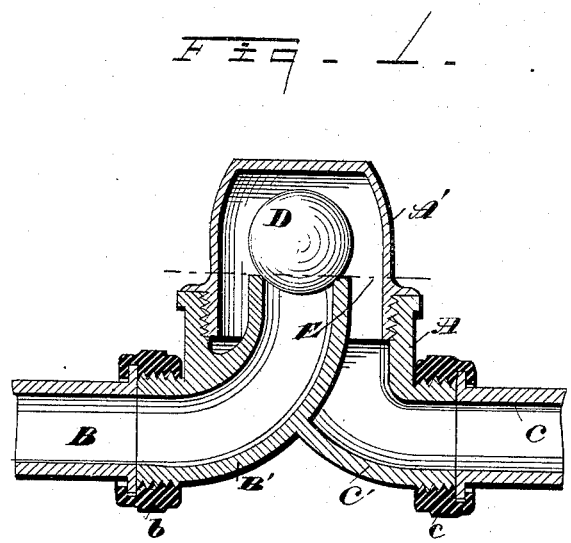

(No Model.) 2 Sheets—Sheet 1.

B. P. BOWER.
SEWER TRAP.

No. 324,645. Patented Aug. 18, 1885.

WITNESSES
Wm. M. Monroe
Geo. W. King

INVENTOR
Buckland Bower
Leggett & Leggett
Attorneys

N. PETERS, Photo-Lithographer, Washington, D. C.

(No Model.) 2 Sheets—Sheet 2.

B. P. BOWER.
SEWER TRAP.

No. 324,645. Patented Aug. 18, 1885.

WITNESSES
Wm. M. Monroe.
Geo. W. King

INVENTOR
Buckland P. Bower
by
Leggett & Leggett,
Attorneys

UNITED STATES PATENT OFFICE.

BUCKLAND P. BOWER, OF CLEVELAND, OHIO.

SEWER-TRAP.

SPECIFICATION forming part of Letters Patent No. 324,645, dated August 18, 1885.

Application filed April 16, 1884. (No model.)

*To all whom it may concern:*

Be it known that I, BUCKLAND P. BOWER, of Cleveland, in the county of Cuyahoga and State of Ohio, have invented certain new and useful Improvements in Sewer-Traps; and I do hereby declare the following to be a full, clear, and exact description of the invention, such as will enable others skilled in the art to which it pertains to make and use the same.

My invention relates to improvements in sewer-traps, and more especially in that class that have ball-valves.

The object of my invention is so to improve the construction of the trap that it may be easily reversed without disconnecting the pipes or changing their position, and that by reversing the trap the valve may be made to operate as a floating-valve or as a gravity-valve, as may be desired. A further object is to improve the shape of the trap so that there will be no corners or superfluous space where sediment or filth can accumulate, but that all parts of the inside of the trap will be in contact with and be washed and kept clean by the current of water in its passage from the trap.

With these objects in view, my invention consists in certain features of construction, and in combination of parts hereinafter described, and pointed out in the claim.

Heretofore in this class of traps the inlet and outlet pipes have usually been attached to the trap at different angles. Usually the inlet-pipe entered the trap in a vertical direction, while the outlet-pipe was attached to one side of the trap.

In my improved trap the two pipes engage the trap on opposite sides and in line with each other. The pipes are preferably attached to the trap by screw-caps, and by unscrewing these a trifle the trap may be reversed or turned to the position desired. The traps have usually been constructed with a cylindrical, conical, or conoidal shaped top with the discharge-pipe leading from one side, and so arranged that on the opposite side of the discharge-pipe, and around the inlet-pipe there was a space that was not reached by the current of water, and in this space filth and sediment would accumulate. One portion of these traps is usually made detachable for the purpose of cleaning them, but the traps are frequently so located that they are not easily accessible for this purpose.

In my improved trap the walls are curved from the outside of the discharge-pipe to near the line of union between the two parts of the trap in such a manner that there is no place where filth can accumulate, but, on the contrary, the current sweeps across the entire surface and the attrition with the sand and other hard sediment that are always present in greater or less quantity, scours the surface and keeps it thoroughly cleansed. The curved surface aforesaid is all under the water-line, except near the nozzle, and when the detachable part or cup is removed there is but little space left in the trap, and this is quite accessible.

Figure 2:
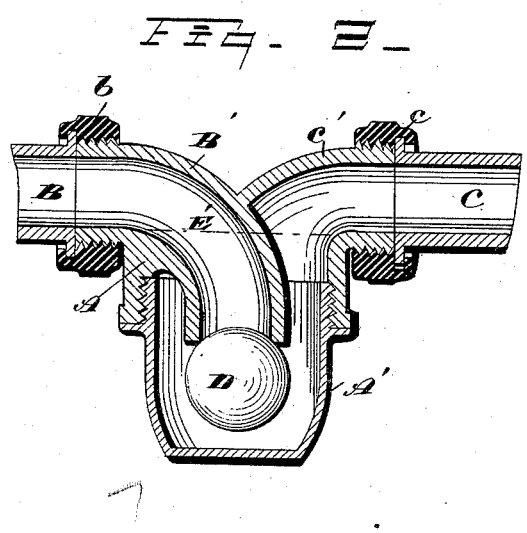
Figure 3:
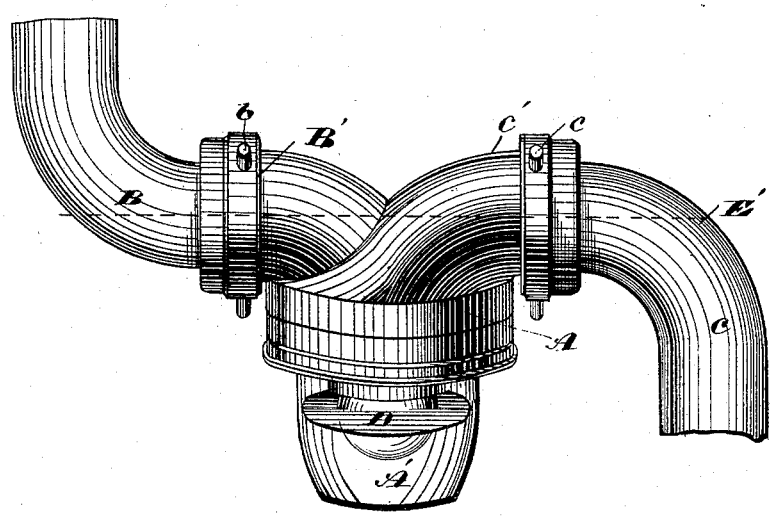

In the accompanying drawings, Figures 1 and 2 are vertical sections of my improved trap, the one showing the trap turned up and the other showing the trap turned down. Fig. 3 is a view in perspective of the trap.

A represents the body of the trap, to which are attached the inlet-pipe B and the discharge-pipe C.

The two parts of the trap are preferably screwed together in the usual manner.

D is the valve seated on the end of the inlet-pipe, as shown, and is preferably a hollow rubber ball, whose specific gravity is less than water. This last feature is not essential when it is used only as a gravity-valve, as would be the case in the position shown in Fig. 1; but when used as a floating valve, as in Fig. 2, it is essential, and when made in this manner is equally effective as a gravity-valve. The relative size of the cup A' and the valve is such as will limit any lateral movement of the valve and cause it to return to its seat. The pipes B and C, when they approach the trap, are in line with each other and are secured to opposite sides of the part A by the screw-caps *b* and *c*, or equivalent mechanism. A short distance from the trap the pipes may be bent as may be required. When the said caps are screwed "home," the trap will be held firmly in its place; but when the caps are unscrewed a trifle the trap may be turned to either of the positions shown, after which the caps are again tightened.

The nozzles B' and C', to which are respectively attached the pipes B and C, are integral with each other and with the part A. The part B' is curved in the manner shown and terminates in a central position in the cup A', and the end thereof is fitted to form a suitable seat for the valve D. The part A is funnel or bell shaped, and at the same time is curved to one side, as shown, and terminates in the nozzle C', the wall of the outer curve embracing the part B'. When it is not desired to reverse the trap, the part B' might be a straight vertical tube terminating at the same point in the part A', as with the construction shown. In either case it will be seen that there is no angle or corner in which sediment or filth can lodge. The part B' occupies so much of the space in the chamber that the water in escaping from the trap must pass on all sides of the tube B', and thus all parts of the walls of the chamber of the part A are swept by the current and kept clean.

E and E' are water-lines.

I am aware that a sewer-trap consisting essentially of a funnel-shaped body provided with a discharge-opening, an inlet-nozzle terminating above the discharge-opening, and a ball-valve resting on the inlet-nozzle is not new, and hence I make no broad claim therefor.

What I claim is—

A sewer-trap provided with a funnel-shaped and curved body terminating on one side in a discharging-nozzle, and a tube curved in the opposite direction and terminating in an inlet-nozzle, the two parts integral and the nozzles in line with each other, and provided with screw-caps or other suitable mechanism for connecting pipes to the nozzles, by means of which the trap may be reversed without disconnecting the pipes or changing their place, substantially as set forth.

In testimony whereof I sign this specification, in the presence of two witnesses, this 28th day of January, 1884.

BUCKLAND P. BOWER.

Witnesses:
 ALBERT E. LYNCH,
 CHAS. H. DORER.